July 8, 1941.   L. C. BROECKER   2,248,489
PNEUMATIC VALVE
Filed Nov. 3, 1939
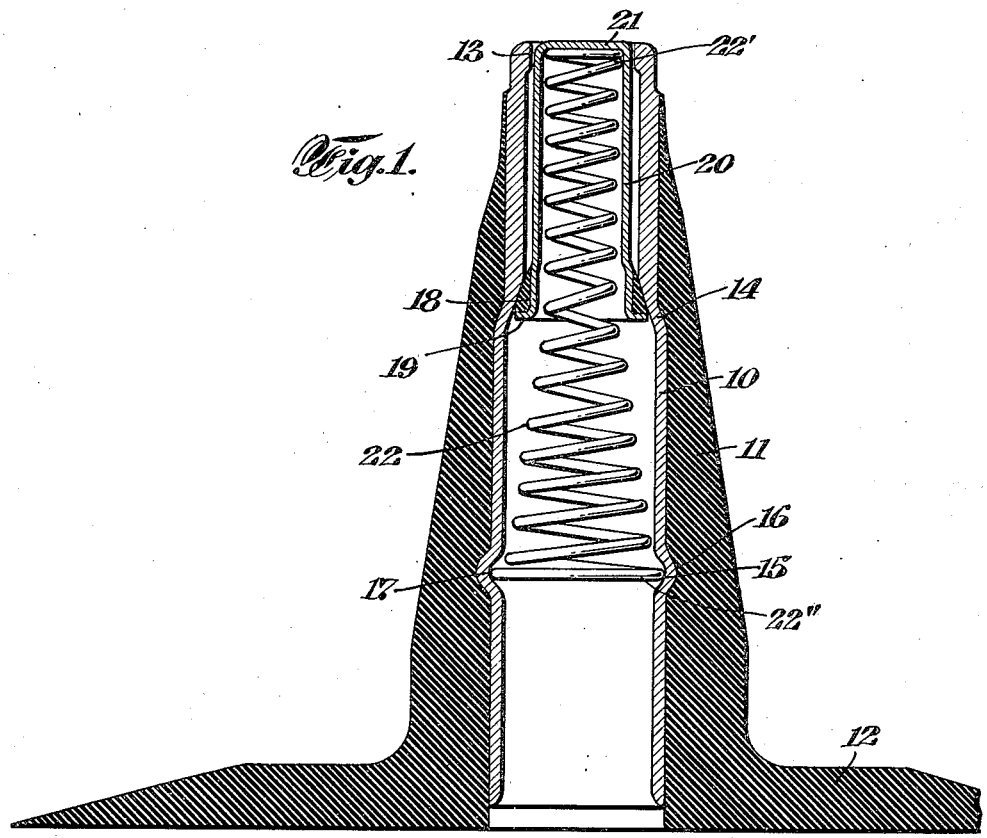
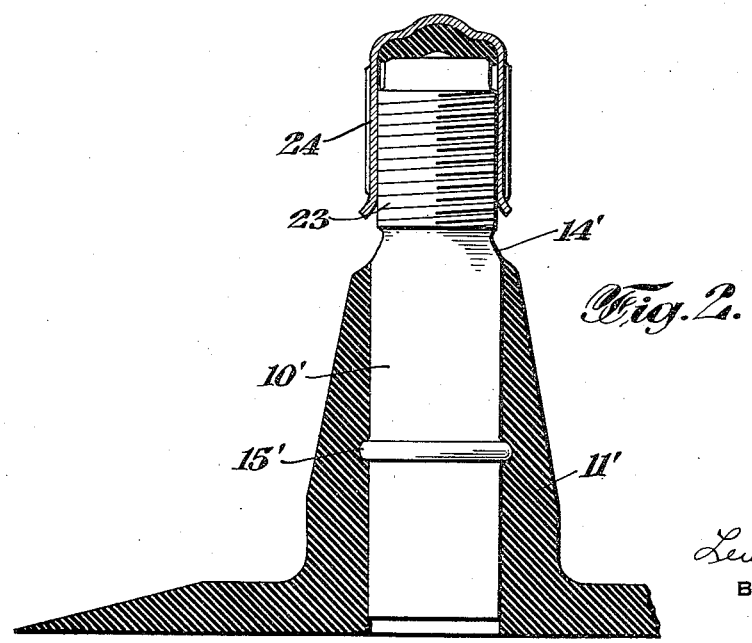
INVENTOR
Lewis C. Broecker
BY Kenyon & Kenyon
ATTORNEYS Patented July 8, 1941

2,248,489

UNITED STATES PATENT OFFICE 2,248,489

PNEUMATIC VALVE

Lewis C. Broecker, Nichols, Conn., assignor to Bridgeport Brass Company, Bridgeport, Conn., a corporation of Connecticut Application November 3, 1939, Serial No. 302,662

7 Claims. (Cl. 277—42)

This invention relates to pneumatic valves and more especially to tire valves of the so-called "rubber stem" type.

An object of my present invention is an improved valve structure which eliminates the disadvantages of the conventional type of valve by providing a valve assembly which is inherently simple.

Another object of this invention is to provide a valve which is of itself dust proof so that it can be used without a dust cap if desired.

Other objects, novel features and advantages of my invention will become apparent from the following specification and accompanying drawing wherein Figure 1 is a longitudinal section through a tire valve embodying the invention and Figure 2 is a longitudinal view, sectional in part, of a tire valve embodying a modification of the invention wherein provision is made for a dust cap.

Referring to Fig. 1:

A metal barrel 10 is supported in a stem 11 of yieldable material, such as rubber or the like, on the lower end of which is an integral flap or base 12 adapted for vulcanization to the exterior surface of a tire tube (not shown). The barrel 10 is preferably composed of sheet metal drawn into the shape shown from a metal disc according to well known manufacturing practice.

It will be noted that the barrel 10 has a neck 13 at its upper end which is of smaller diameter than the bore of the barrel immediately adjacent to the neck and that it is also formed at 14 with an interior shoulder which is beveled to provide a valve seat. An annular section 15 of somewhat greater diameter is rolled in barrel 10 near the lower portion thereof, forming an exterior shoulder 16 and an internal recess or seat 17.

The valve body 18, which is adapted to engage the valve seat 14, is preferably formed of rubber or other suitable material and is vulcanized onto and supported by flange 19 which extends laterally and outwardly from the bottom of the inverted cup-shaped cap or sleeve 20, which may also be formed from a sheet metal disc. The cup-shaped or cylindrical cap 20 is of such length that with valve 18 seated, its base or closed end 21 is normally adjacent to opening 13, and of such diameter that it provides a closure effective to prevent the entry of dirt and other foreign matter, while the cylindrical cap or sleeve 20 is slideably movable in the barrel 10.

A helical spring 22 is positioned within the cup-shaped sleeve 20 and is so formed that the coils located below flange 19 are of increasing diameter, the lowermost coil being engaged in the recess provided by the annular section 15 of barrel 10.

In assembling the valve, the upper end of spring 22 is placed within the inverted cup or sleeve 20 and may, if desired, be soldered to or otherwise permanently affixed therein. However, the spring 22 is preferably held within the cup or sleeve 20 by the frictional engagement of the upper end of the spring with the inner surface thereof, and, if necessary, the end convolution 22′ may be of greater diameter to insure sufficient frictional engagement with the interior of the cup or sleeve 20. The cup and spring are then inserted through the bottom opening of barrel 10, the spring being compressed by means of a suitable tool. When the cup and spring have been inserted so that the lowest and preferably widest coil 22″ of the spring is adjacent to the recess or seat 17 provided by the rolled section 15, the tool is removed and the end coil 22″ of the released spring fits the recess or seat 17 provided by the section 15 and forces valve 18 into sealing engagement with valve seat 14. At the same time the base or closed end 21, as already stated, will form a closure for opening 13.

The entire assembly 18 to 22′ inclusive may, by means of an appropriate tool, be forced into the barrel 10, thereby providing an air-tight whole. The shoulder 16 formed by the annular section 15 cooperates to hold the barrel 10 within and to the rubber stem 11. I insert the valve assembly from the bottom of the valve stem.

As will be readily seen from the figure and the above description, cup or sleeve 20 and its base or closed end 21 not only serve as a closure to prevent the entry of dirt and the like, but the cylindrical body thereof also serves as a guide to prevent undue angular displacement of the valve body 18 and thus insures its effective seating.

When it is desired to inflate a tire provided with this improved valve structure, the chuck of the conventional inflating device, contacting the base or closed end 21 of the cup 20, will force the cup downwardly against the compression of spring 19. Since the bore of the barrel below opening 13 is of greater diameter than this opening, ample space is provided around cup 20 to permit the entry of air into the tube without any substantial resistance to its flow. During the inflation operation valve 18 will be unseated by the above-mentioned action of the chuck and partly by the pressure of the inflowing air. When the inflation is complete and the chuck is removed, spring 22 will force valve body 18 into sealing engagement with valve seat 14 and will at the same time cause the base or closed end 21 of cup or sleeve 20 to assume the position of closure in opening 13.

Figure 2 is a modification wherein the same numbers with primes affixed designate the same parts as above described in relation to Figure 1. It will be noted, however, that the rubber valve stem 11' does not engage the valve beyond shoulder 14' and that the upper part of barrel 10' is provided with a screw thread 23 which is adapted to engage the thread of a conventional dust cap 24. By using the structure shown in Fig. 2, I provide a valve which may be used either with or without a dust cap as the user prefers.

Owing to the sturdy construction and simplicity of my valve, its life will ordinarily be as long as that of the tube of which it forms a part. However, if it should be necessary to replace it, the entire valve assembly can be forced out of valve barrel 10 by an appropriate tool and a new valve assembly inserted to replace it. This operation I perform from the bottom of the valve stem by means of an opening cut into the tube just beneath the stem, said opening being patched or vulcanized by known means after the new valve has been inserted.

I claim:

1. A tire valve comprising a barrel having an interior shoulder providing a valve seat, an inverted cup-shaped member slidably positioned in said barrel and adapted to serve as a closure for the upper or outer end thereof, a valve body mounted on the wall of and at the lower or inner end of said cup-shaped member and adapted to seat against said valve seat, a spring within said barrel member extending into and secured to said cup-shaped member and also engaging a part of said barrel to normally hold said valve body on its seat, the inverted cup-shaped member, the valve body and the spring being adapted to be inserted into and removed from the barrel as a unit.

2. A tire valve comprising a barrel having an internal shoulder to provide a valve seat located in the upper portion of said barrel, said barrel also being provided with an internal shoulder in the lower portion thereof, an inverted cup-shaped member slidably positioned in said barrel with its closed end adapted to fit within and serve as a closure for the upper or outer end of said barrel, said cup-shaped member being provided with a valve body on the wall of said member at its lower end adapted to seat against said valve seat, a spring located within said barrel having one end extending into and secured to said cup-shaped member and with the other end engaging said lower internal shoulder so as to normally hold said valve body on its seat and said cup-shaped member in closed position for the end of the barrel, the inverted cup-shaped member, the valve body and the spring being adapted to be inserted into and removed from the barrel as a unit.

3. A tire valve comprising a barrel having a beveled internal shoulder to provide a valve seat located in the upper portion of said barrel, said barrel also being provided with an internal shoulder in the lower portion thereof, an inverted cup-shaped member slidably positioned in said barrel with its closed end adapted to fit within and serve as a closure for the upper or outer end of said barrel, said cup-shaped member being provided with a valve body on its lower end adapted to seat against said valve seat, a spring located within said barrel having one end engaging said cup-shaped member and with the other end engaging said lower internal shoulder so as to normally hold said valve body on its seat and said cup-shaped member in closed position for the end of the barrel, said spring having its upper or outer convolution somewhat wider than the adjacent convolutions so as to frictionally engage the inner surface of the inverted cup-shaped member.

4. A tire valve comprising a barrel having a beveled internal shoulder to provide a valve seat located in the upper portion of said barrel, said barrel also being provided with an internal shoulder in the lower portion thereof, an inverted cup-shaped member slidably positioned in said barrel with its closed end adapted to fit within and serve as a closure for the upper or outer end of said barrel, said cup-shaped member being provided with a valve body on its lower end adapted to seat against said valve seat, a spring located within said barrel having one end engaging said cup-shaped member and with the other end engaging said lower internal shoulder so as to normally hold said valve body on its seat and said cup-shaped member in closed position for the end of the barrel, said spring having its upper or outer convolution somewhat wider than the adjacent convolutions so as to frictionally engage the inner surface of the inverted cup-shaped member, the lower portion of said spring having its convolutions of increasing diameter with its lower or innermost convolution being of widest diameter to engage said lower internal shoulder.

5. A tire valve comprising a cylindrical barrel having its upper or outer end formed with a slightly restricted opening, said barrel being also formed with a tapered valve seat located on its inner surface and in its upper or outer portion, said barrel also being rolled or forced outwardly in its lower portion to provide an internal shoulder and also an external shoulder, a closure member in the form of an inverted cup or closed cylinder having its closed end positioned within the restricted opening of said barrel and having its lower or inner end flanged outwardly with a valve body secured to said lower end and resting upon said flange and adapted to engage said valve seat, a spring located within said barrel and having a portion positioned within said cup-shaped member with one end engaging said cup-shaped member, the other end of the spring engaging said internal shoulder so as to normally hold said valve body on said valve seat and the closed end of said cup-shaped member in closed position with respect to said restricted opening of the barrel.

6. A tire valve comprising a cylindrical barrel having its upper or outer end formed with a slightly restricted opening, said barrel being also formed with a tapered valve seat located on its inner surface and in its upper or outer portion, said barrel also being rolled or forced outwardly in its lower portion to provide an internal shoulder and also an external shoulder, a closure member in the form of an inverted cup or closed cylinder having its closed end positioned within the restricted opening of said barrel and having its lower or inner end flanged outwardly with a valve body secured to said lower end and resting upon said flange and adapted to engage said valve seat, a spring located within said barrel and having a portion positioned within said cup-shaped member with one end engaging said cup-shaped member, the other end of the spring engaging said internal shoulder so as to normally hold said valve body on said valve seat and the closed end of said cup-shaped member in closed position with respect to said restricted opening of the barrel, and a body composed of rubber or other suitable plastic material molded around said barrel and over said external shoulder so as to provide a so-called rubber valve stem which is capless.

7. A tire valve comprising a rubber stem or body, a barrel positioned within said stem and having means for interlocking it with said stem, said barrel also having an interior shoulder providing a valve seat and being provided with a restricted opening at its upper or outer end, a cylindrical or cup-shaped member closed at one end and having a flange at its opposite end and slidably positioned in said body, a valve member mounted upon and secured to said flange and adapted to seat against said valve seat, a spring member positioned within said barrel, one end of said spring engaging part of said barrel and the other end fitting within and engaging the closed end of said cylindrical member so as to engage said valve member with said valve seat and to bring the closed end of said cylindrical member into closure-forming relationship with said neck.

LEWIS C. BROECKER.